United States Patent [19]

Morr et al.

[11] 4,247,833

[45] Jan. 27, 1981

[54] MINIMUM LENGTH DIFFUSER FOR CHEMICAL LASERS

[75] Inventors: Garry F. Morr, Huntsville; Stanley L. Pruett, Arab, both of Ala.

[73] Assignee: The United States of America as represented by the Secretary of the Army, Washington, D.C.

[21] Appl. No.: 19,539

[22] Filed: Mar. 12, 1979

[51] Int. Cl.³ .............................................. H01S 3/08
[52] U.S. Cl. .............................................. 331/94.5 G
[58] Field of Search ............... 331/94.5 G, 94.5 C, 331/94.5 P, 94.5 D; 239/553.5, 590.5, 265.11

[56] References Cited

U.S. PATENT DOCUMENTS

| 3,860,885 | 1/1975 | McLafferty | 331/94.5 P |
| 3,886,477 | 5/1975 | Ruby et al. | 331/94.5 G |
| 3,998,393 | 12/1976 | Petty | 331/94.5 G |

Primary Examiner—William L. Sikes
Assistant Examiner—Léon Scott, Jr.
Attorney, Agent, or Firm—Nathan Edelberg; Robert P. Gibson; James T. Deaton

[57] ABSTRACT

A minimum length diffuser for transforming low pressure, supersonic laser exhaust gas flow to a subsonic flow at an elevated static pressure using structures which produce a single, near normal shock, or a single pair of normal shocks due to flow symmetry and also incorporating structures which induce a strong, stable cellular subsonic flow to allow rapid diffusion of the subsonic flow.

12 Claims, 5 Drawing Figures

4,247,833

MINIMUM LENGTH DIFFUSER FOR CHEMICAL LASERS

DEDICATORY CLAUSE

The invention described herein may be manufactured, used, and licensed by or for the Government for governmental purposes without the payment to us of any royalties thereon.

BACKGROUND OF THE INVENTION

In the prior art devices, conventional diffusers have required supersonic throat lengths of 6 to 10 times the inlet height of the supersonic gas flow for Mach numbers of interest in chemical lasers. Also, there is a need for a minimum length diffuser in chemical lasers which characteristically operates at very low static pressures with gas outlet total temperatures of about 1500 to 2000 degrees Kelvin. Laser exhaust gases typically have a Mach number of approximately 2 with a total pressure of approximately 30 to 60 torr. The gas is normally diffused through conventional techniques to a high pressure subsonic flow condition in which a reactive chemical bed converts the gas to solid products having very low vapor pressures. The low pressure laser operating regime is conducive to very high laser efficiency, but these prior art devices require a large cross-sectional gas flow area to achieve large mass flow and thus high laser power. Practical constraints usually dictate a maximum laser gain length. The laser device power can only be increased by increasing the height of the gas cross-sectional flow area. Conventional diffusers which increase in length by fixed proportions to gas cross-sectional height become very large, heavy, and costly, eventually limiting laser power which can be generated within prescribed volume and weight limits. Therefore, there is a need for a diffuser that has reduced volume to accomplish improved pressure recovery performance, reduced weight, and reduced cost.

Therefore, it is an object of this invention to provide a minimum length diffuser which is essentially independent of cross-sectional height of the flow area.

Another object of this invention is to provide a diffuser which requires approximately one-sixth to one-tenth the volume of a conventional diffuser for laser bank heights of 6 to 10 inches.

Still another object of this invention is to provide a diffuser that has reduced volume accompanied by improved pressure recovery performance, reduced weight, and reduced cost.

Still another object of this invention is to provide a diffuser which can effectively be used to increase the laser power and can be packaged in a restricted weight or volume situation.

Other objects and advantages of this invention will be obvious to those skilled in this art.

SUMMARY OF THE INVENTION

In accordance with this invention, a minimum length diffuser for chemical lasers is provided in which the flow passage is generally rectangular and streamlined from an inlet section to an outlet section. A shock formation and stabilization device is located intermediate the inlet and outlet and has a knife edge at the center with the surfaces curving in opposite directions away from the knife edge and in another embodiment also curving from the outer periphery toward the center. This structure is provided for producing normal shocks and also inducing a strong, stable cullular subsonic flow to allow rapid diffusion of the subsonic flow. The length of the diffuser herein disclosed in essentially independent of the flow inlet height as opposed to conventional diffuser structures of prior devices. The diffuser when installed in a system transforms low pressure, supersonic laser exhaust to a subsonic flow condition at an elevated static pressure at the chemical pump.

DESCRIPTION OF THE PREFERRED EMBODIMENT

Figure 2:
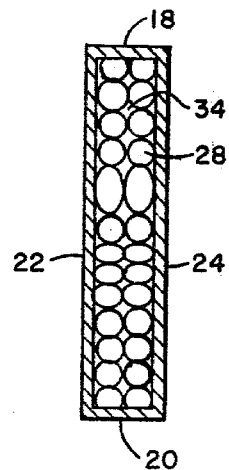
FIG. 2 is a sectional view of the diffuser along line 2—2 of FIG. 1.
Figure 1:
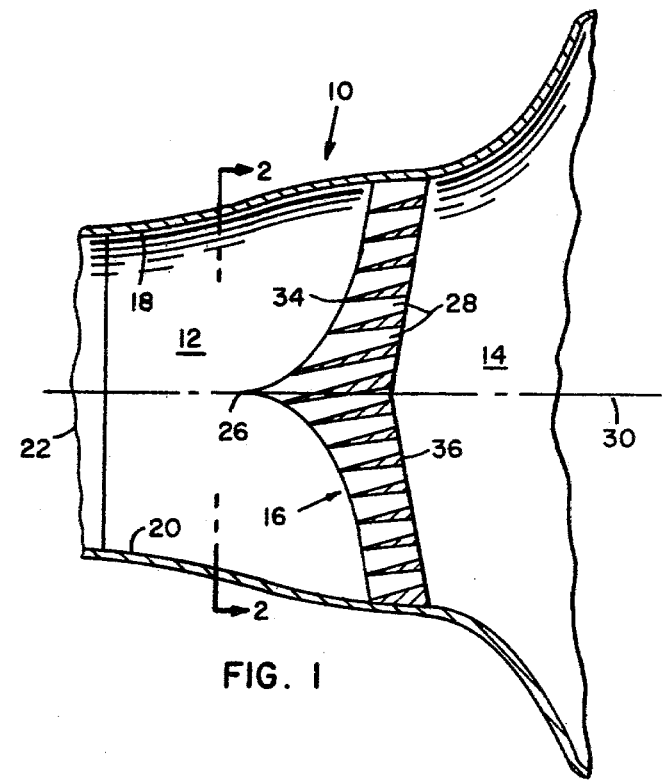
FIG. 1 is a sectional view illustrating a diffuser in accordance with this invention.

Referring now to the drawing, a diffuser 10 in accordance with this invention is illustrated in FIGS. 1 and 2 and includes an inlet passage 12, an outlet passage 14, with a shock formation and stabilization device 16 mounted therebetween. As illustrated, upper and lower walls 18 and 20 are streamlined and side walls 22 and 24 are parallel or tapered outwardly at a slight angle in the direction of gas flow. Shock formation and stabilization device 16 has a front knife edge 26 for causing a near normal shock wave in opposite directions to be produced. Shock formation and stabilization device 16 has a plurality of passages 28 therethrough with passages 28 being canted or oblique to center axis 30 through the diffuser. Passages 28 are arranged in a plurality of rows as illustrated in FIG. 2 and one row of passages 28 are canted upward and the other row is canted downward. Passages 28 in opposite rows are canted in opposite directions in order to produce a cellular vortex pattern similar to that illustrated in FIG. 5. Even though two rows of passages 28 are illustrated, more rows can be used. Each of passages 28 are frusto-conical in shape as illustrated and has a larger diameter at the inlet to the shock formation and stabilization device. Inlet 12 is fabricated to have a total flow area approximately equal to the area of the inlets to passages 28. The exit ends from passages 28 have a flow area which is less than that at the inlets due to the frustro-conical shape and this is utilized to cause the production of subsonic flow with increased pressure at the exit side or outlet 14 of the diffuser. As illustrated, opposite surfaces 34 on opposite sides of knife edge 26 cause the flow to be divided and produce a near normal shock wave through which the supersonic gases must pass before going through ports 28. Ideally, the shock created adjacent surfaces 34 would be normal to the flow through inlet 12 on its way through passages 28. Rear surfaces 36 generally tapers inwardly to the center as illustrated.

Figure 4:
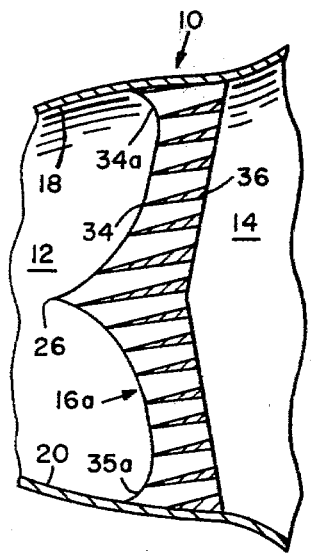
FIG. 4 is a sectional view of another diffuser embodiment in accordance with this invention.

Referring now to FIG. 4, another embodiment of this invention of the diffuser is illustrated in which all elements are the same except for the upper and lower edges of the shock formation and stabilization device 16a. In this embodiment, the shock formation and stabilization device 16a has upper curved surface 34a and lower curved surface 35a which cause a pair of shock waves to be produced on either side of knife edge 26. That is, a shock wave is produced and directed inwardly from tapered surface 34a and an oppositely directed shock wave from knife edge 26 is directed outwardly along surface 34. This same type shock formation is also produced from the lower surface of knife edge 26 and tapered surface 35a. These shock formations function to act upon the supersonic flow from inlet 12 in substantually the same manner as that described for FIGS. 1 and 2.

Figure 3:
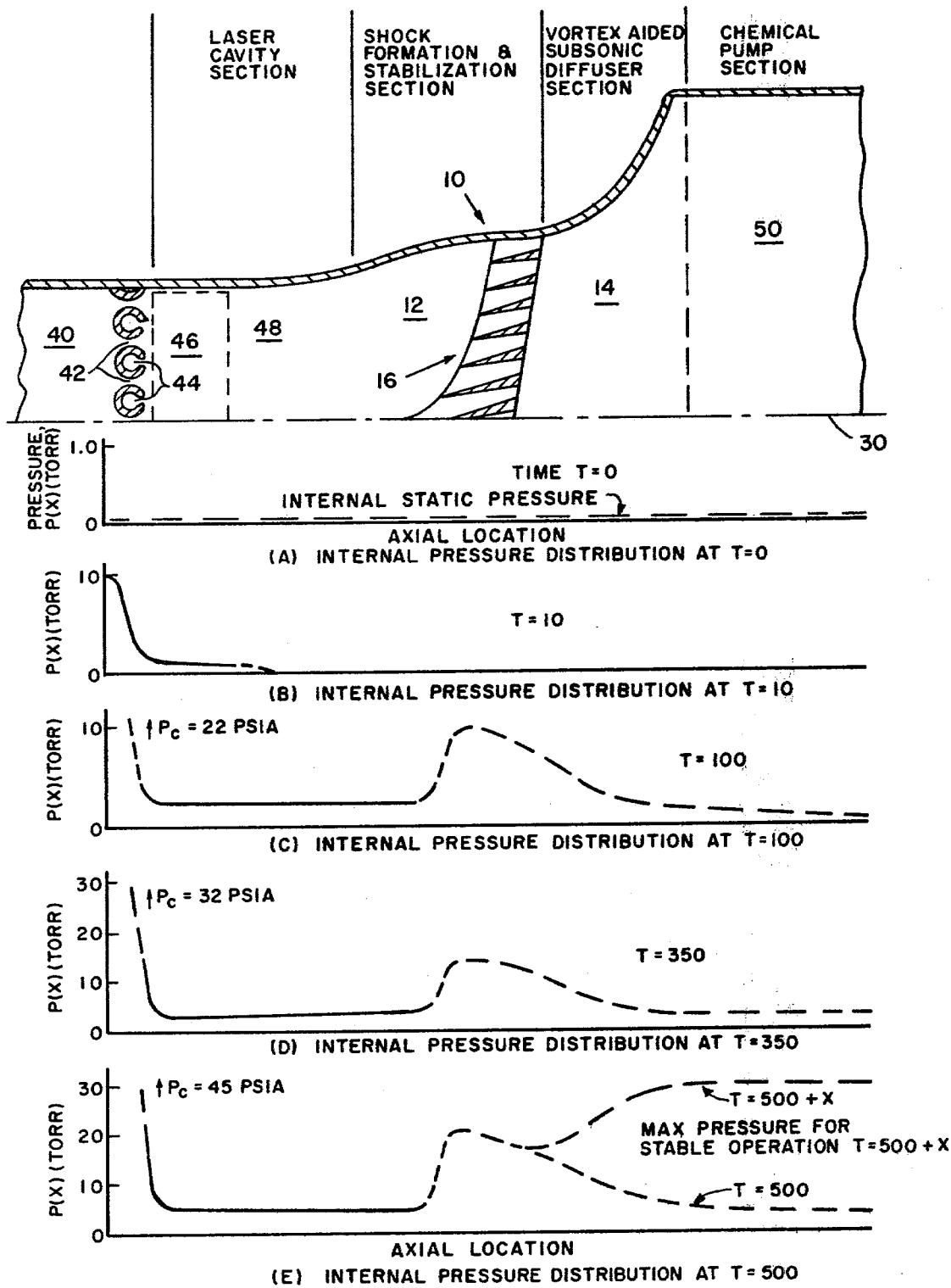
FIG. 3 is a schematic view of an overall laser system and illustrating by graphs internial pressure distribution along actual locations of the system under specific conditions.

Referring now to FIG. 3, the diffuser is adapted to be used in a closed chemical laser system that has a combustor section or chamber 40 to which oxidizer, diluent and precombustor fuel is introduced in a conventional manner to be passed through nozzle passages 42 and to be mixed with the main fuel supply being provided through nozzles 44 in a conventional manner. Main fuel entering through passages 44 for example can be deuterium. Next, the system includes a reactive lasing section from which the laser gets its output and is illustrated in dotted line section as 46. This section 46 along with section 48 just down stream therefrom constitutes the laser cavity section of the system. The laser cavity section is then connected to inlet 12 of the diffuser and a section of the diffuser is illustrated as being the shock formation and stabilization section. The portion down stream of shock formation and stabilization device 16 at outlet 14 is designated as the vortex aided subsonic diffuser section. Down stream from outlet 14 is a conventional chemical pump 50 for pumping the system and causing a low pressure to be maintained in the system.

Figure 5:
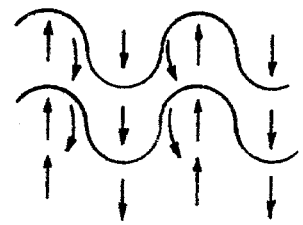
FIG. 5 is a view illustrating flow patterns as the gases leave the diffuser.

In operation, it is pointed out that use of the minimum length diffuser requires the removal of high pressure, or ambient pressure condition, against which supersonic flow through the laser cavity is initiated. That is, initiation of operation of the minimum length diffuser is always initiated with a "zero" back pressure condition throughout the system, that is with a residual static pressure in the diffuser as well as the overall system of for example less than one torr. This is illustrated in FIG. 3 by graph A designating internal pressure distribution at t=0. The low pressure or vacuum condition is automatically insured by using chemical pump 50 for chemical laser applications which utilize a conventional reactive bed chemical pump, since the pump reacts laser gas products under static or no flow conditions until forward and reverse reaction rates are equal, which is compositional and temperature dependent, but typically occurs at less than one-tenth torr pressure. Thus, it can be seen that the minimum length diffuser used in the operation of this sytem begins its function with zero pressure throughout the entire system as shown in FIG. 3, at time t=0. Laser operation actually begins with the introduction of oxidizer, diluent and precombuster fuel into combustor chamber 40 in a conventional manner to cause rapid combustion processes to begin either by hypergolicity of the gas mixture or by conventional ignition system means. Full combuster operation in chamber 40 is achieved in about 200 to about 500 milliseconds. A typical pressure profile throughout the entire laser system including combuster chamber 40, laser cavity section, diffuser 10 and chemical pump 50 during start transition is shown in FIG. 3, at time t=10 on graph B. That is, the gases have been introduced into combuster chamber 40 and fuel through nozzles 44, but actual flow has not reached diffuser 10 as illustrated in graph B. At t=10, the combuster pressure in chamber 40 has risen sufficiently to produce choked flow in the primary gas injection nozzles through nozzle passages 42. The combustion gas is propagating into the remaining evacuated regions at sonic speeds, but has not yet reached the shock formation and stabilization region of minimum length diffuser 10. At this instant in time the gas conditions in combuster 40 (up to the throat of primary injection nozzles 42) is a subsonic flow condition. The gas conditions from the throats of nozzles 42 of the primary injection nozzles to the (mass) propagation front is in supersonic flow and main fuel supply is being provided through nozzles 44. Essentially no gas is present beyond the propagation front at this time. At some time later, for example at t=100 as illustrated in graph C, the propagation front has reached the shock forming and stabilization section of the diffuser and initiated a stationary shock along the front of shock forming and stabilization device 16. Also, the propagation front has passed on into passages 28 of the diffuser and into the subsonic outlet region 14 and eventually into chemical pump section 50 where the gas is reacted to solid products. The reaction rate of chemical pump 50 is sufficiently fast at the (transient) flow rate to maintain an absolute pressure in the pump and subsonic diffuser at outlet 14 of approximately 1 torr or less. For any time greater than t=100, selected here for illustration, but less than that required to acheive steady state laser gas flow rates, the illustrated flow pattern in graph C is maintained. It is pointed out that the combustion pressure $P_C$ at this time is given as 22 psia. As the flow rate increases with time, the major change induced is a static pressure increase, as shown in FIG. 3 for time t=350 on graph D. At steady state flow conditions as illustrated in FIG. 3 on graph E at t=500, the stable flow pattern is retained until the chemicals in chemical pump 50 are expended to such an extent to cause a maximum pressure above stable operation to occur as illustrated on graph E by t=500+X. That is, once the steady state gas flow has been obtained as illustrated in graph E at t=500, the static pressure down stream of shock formation and stabilization device 16 at outlet 14 can be increased (as does occur in conventional chemical pump under normal operation as the reactive bed is consumed.) The degree to which the static pressure at outlet 14 of diffuser 10 can be allowed to increase while maintaining stable supersonic flow up stream of the shock formation and stabilizer device 16 is determined primarily by the specific design of the overall diffuser. As disclosed here, a large divergent angle subsonic diffuser section at outlet 14 with no internal vanes is utilized. The large divergence angle is useable in this section by alternately inclining passages 28 above and below the horizontal reference axis 30 to produce a macroscopic vortical flow at outlet 14 similar to that as illustrated in FIG. 5. This feature, based on a strong, cellular flow at the exit of the shock induction section effectively prevents separation of the gas flow from the upper and lower subsonic diffuser surfaces even with adverse actual pressure gradients. The maximum allowable static pressure at diffuser exit 14 is determined by combined considerations involving the inlet gas flow conditions, the geometry of the shock formation front and stabilization section and the overall geometry of the subsonic diffuser section. For each particular combination of the above parameters, a maximum static pressure exists for which the near normal shock is stable and located down stream of the laser cavity section.

For optimum operation of the diffuser, the boundary layer on the surfaces of upper and lower walls 18 and 20 is prevented from separating therefrom. This is accomplished by providing local gas flow expansion by utilizing streamlined surfaces as illustrated. For prescribed flow parameters, such as static pressure, specific heat ratio, Mach number, and molecular weight, the shape of the contour of streamlining to prevent separation is independent of length and in accordance with the selected parameters will have a shape similar to that illustrated in FIGS. 1 and 2. In the alternate approach illustrated in FIG. 4, the boundary layer control process is combined with the shock formation and stabilization section that originates at knife edge 26. In this embodiment, the center section of the shock formation device originating at knife edge 26 functions as before with an attached oblique shock which steepens to form a normal shock near the ¼ height points in opposite directons in the flow device. A second set of oblique shocks is formed at the upper and lower shroud surfaces by utilizing tapered surfaces 34a and 35a. The shocks induced by tapered surfaces 34a and 35a result in attached boundary layer flow just behind the shocks which again steepen and intersect and emerge with the shocks originating at knife edge 26 and directed in opposite directions. Other boundary layer stabilization techniques might be employed, but those disclosed herein are preferred.

We claim:

1. A diffuser comprising a conduit structure with an inlet and an outlet, said conduit structure being defined by two streamlined side walls that are streamlined for flow by the side walls being tapered outwardly from the inlet to the outlet and being interconnected by two other side walls, a shock formation and stabilization device mounted in said conduit intermediate said inlet and said outlet, said shock formation and stabilization device having a knife edge at the inlet side with a curved surface on each side of said knife edge that curves towards its respective streamlined side wall, said shock formation and stabilization device having a plurality of passages therethrough, and the total area of the openings of said passages on the inlet side of said shock formation and stabilization device being up to as great as the area at said inlet.

2. A diffuser as set forth in claim 1, wherein said passages are frusto-conical and decrease in area in the direction from the inlet to the outlet.

3. A diffuser as set forth in claim 2, wherein said passages are arranged in rows and said passages in opposite rows being canted in opposite directions relative to a center line of said conduit structure.

4. A diffuser as set forth in claim 1, wherein said shock formation and stabilization device has curved surfaces at the inlet side adjacent said streamlined side walls that merge with their respective curved surface from said knife edge.

5. A diffuser as set forth in claim 4, wherein said passages are frusto-conical and decrease in area in the direction from the inlet to the outlet.

6. A diffuser as set forth in claim 5, wherein said passages are arranged in rows and said passages in opposite rows being canted in opposite directions relative to a center line of said conduit structure.

7. In a chemical laser having a combustor chamber section interconnected by laser nozzles to a resonant laser cavity section, and said laser cavity section being interconnected to a chemical pump by a diffuser structure the improvement comprising: said diffuser structure having a conduit section with an inlet and an outlet, said conduit section being defined by two streamlined side walls streamlined for flow by the side walls being tapered outwardly from the inlet to the outlet and being interconnected by two other side walls, a shock formation and stabilization device mounted in said conduit intermediate said inlet and said outlet, said shock formation and stabilization device having a knife edge at the inlet side with a curved surface on each side of said knife edge that curves toward its respective streamlined side wall, said shock formation and stabilization device having a plurality of passages therethrough, and the total area of the openings of said passages on the inlet side of said shock formation and stabilization device being up to as great as the area at said inlet.

8. A diffuser as set forth in claim 7, wherein said passages are frusto-conical and decrease in area in the direction from the inlet to the outlet.

9. A diffuser as set forth in claim 8, wherein said passages are arranged in rows and said passages in opposite rows being canted in opposite directions relative to a center line of said conduit structure.

10. A diffuser as set forth in claim 7, wherein said shock formation and stabilization device has curved surfaces at the inlet side adjacent said streamlined side walls that merge with their respective curved surface from said knife edge.

11. A diffuser as set forth in claim 10, wherein said passages are frusto-conical and decrease in area in the direction from the inlet to the outlet.

12. A diffuser as set forth in claim 11, wherein said passages are arranged in rows and said passages in opposite rows being canted in opposite directions relative to a center line of said conduit structure.

* * * * *